J. A. SPRAGUE & B. O'CONNOR.
SELF LOADING CART.
No. 12,562. Patented Mar. 20, 1855.
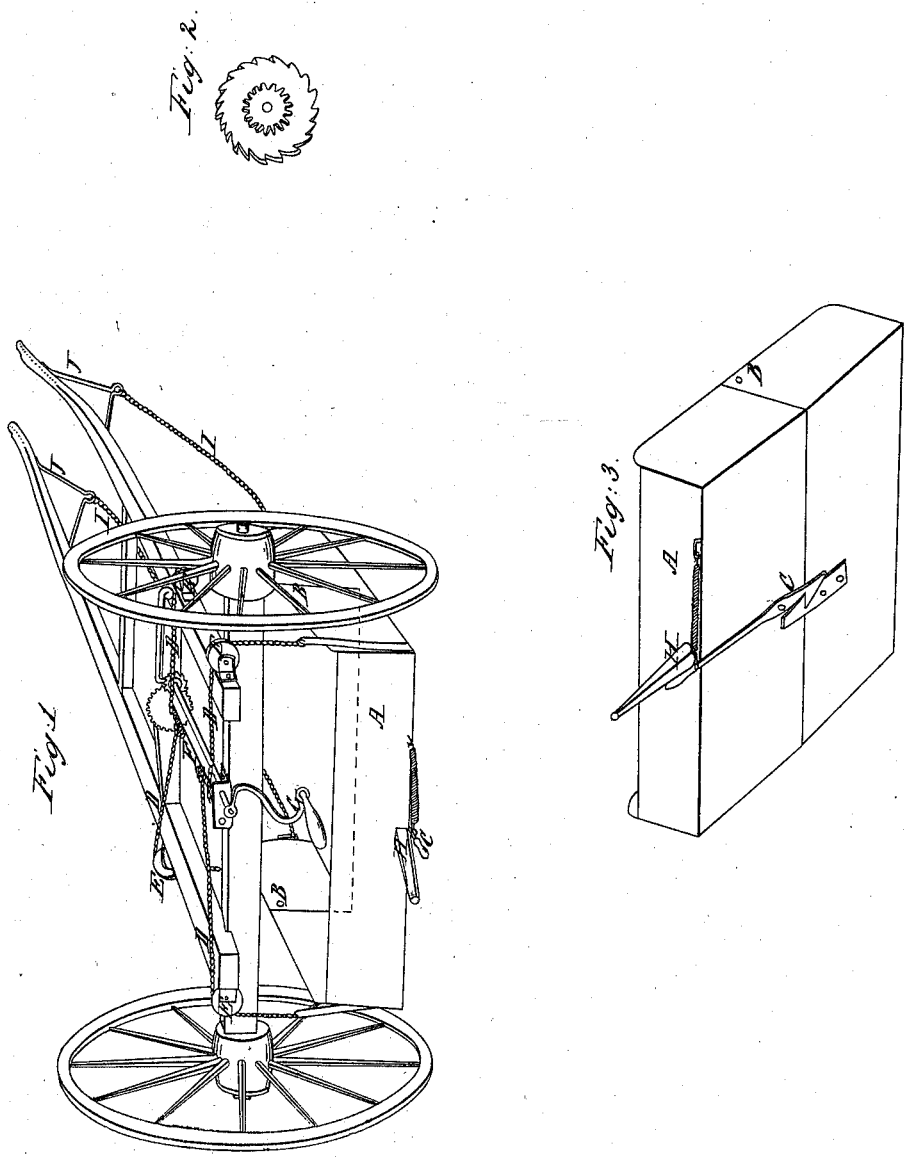

UNITED STATES PATENT OFFICE.

JOHN A. SPRAGUE AND BERNARD O'CONNOR, OF DAYTON, OHIO.

SELF-LOADING CART.

Specification of Letters Patent No. 12,562, dated March 20, 1855.

*To all whom it may concern:*

Be it known that we, JOHN A. SPRAGUE and BERNARD O'CONNOR, of the city of Dayton and State of Ohio, have invented a new and useful machine which we call a "Scoop-Cart"; and we do hereby declare that the following is a full and exact description thereof, reference being had to the accompanying drawings and to the letters of reference marked thereon.

Our invention consists of a large scoop or scraper A, of sufficient dimensions to hold a cart load of earth, more or less, constructed of iron and steel or any suitable material and divided transversely a little back of the center and the two parts joined to each other by the hinges B, B, at the upper inner corners of the sides and by a spring hook C, and catch under the bottom, it being so divided and put together for the purpose of dropping the load through the bottom by its own weight when the hook C, is disengaged from the catch. The said scoop A, is suspended under an ordinary cart by the four chains D, D, D, D, which pass over the pulleys E, E, E, E, on the cart shafts and wind around the windlass shaft F, placed between and parallel with the said cart shafts and which is turned by the crank G, by a man standing behind, and by which means the scoop when filled may be elevated to admit of its being hauled away and discharged, which is done by disengaging the spring C, which allows the two parts of the bottom to separate and the load fall down between them, without stopping the horse, when the driver by forcing down the lever H, closes again the two parts of the scoop which are retained by the spring hook and catch.

On the underside of the cart shafts near their forward ends are placed the angle irons J, to which the chains from an extra team used to assist in loading said scoop, are attached, and from which chains or ropes run back to the scoop, by which means the draft of the extra team is combined with the force of the horse in the cart, and also the draft upon the scoop lowered and brought nearer a horizontal line, and also the pressure upon the back of the horse in the cart, from the draft of the extra team, materially relieved and lessened.

The manner of operating our invention is as follows: The ground being plowed the scoop cart is brought upon it to a suitable place when an extra team is hitched in front to the angle irons J, and the scoop being lowered to the ground and guided in by the handle or lever H, the extra team and the horse in the cart are driven forward in concert about six feet which is generally sufficient to fill the scoop; the extra team is then detached, and stands still while the scoop is elevated and driven away and another brought into its place, when the extra team is again hitched on, and so on in succession, by which the extra team serves to load a given number or "gang" as they severally arrive, and by which the said extra team in assisting to load the scoop, does the work virtually of a large number of shovelers.

We do not claim the combination of a large scoop or scraper (undivided) with the ordinary cart, by suspension in such a manner, that the scoop or scrapper may be raised or lowered by a windlass or lever for this has been done before; neither do we claim dividing the scoop transversely near the middle as such a device has been known and applied in dredging machines.

What we claim as our invention and desire to secure by Letters Patent is—

1. The combination of a large divided scoop constructed as described, with an ordinary cart, in the manner and for the purpose substantially, as herein specified and set forth.

2. The angle irons J, on the underside of the cart shafts near their forward ends, for the purpose herein specified and described.

Dayton, March, 1855.

JOHN A. SPRAGUE.
BERNARD O'CONNOR.

Witnesses:
C. E. SMITH,
GEO. M. YOUNG.